(12) United States Patent
Watanabe

(10) Patent No.: US 8,731,044 B2
(45) Date of Patent: May 20, 2014

(54) MOVING-PICTURE PROCESSING APPARATUS

(75) Inventor: Yasuhiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1386 days.

(21) Appl. No.: 11/896,643

(22) Filed: Sep. 4, 2007

(65) Prior Publication Data

US 2008/0079743 A1 Apr. 3, 2008

(30) Foreign Application Priority Data

Sep. 4, 2006 (JP) ................................ 2006-238537

(51) Int. Cl.
*H04B 1/66* (2006.01)

(52) U.S. Cl.
USPC ......................................................... 375/240

(58) Field of Classification Search
USPC ......................................................... 375/240
See application file for complete search history.

(56) References Cited

U.S. PATENT DOCUMENTS

| | | | | |
|---|---|---|---|---|
| 5,717,394 A * | 2/1998 | Schwartz et al. | ................ | 341/51 |
| 6,356,589 B1 * | 3/2002 | Gebler et al. | ................ | 375/240.1 |
| 2002/0174401 A1* | 11/2002 | Wang et al. | ................ | 714/786 |
| 2003/0222882 A1* | 12/2003 | Jeffrey et al. | ................ | 345/560 |
| 2006/0023954 A1* | 2/2006 | Ishizuka et al. | ................ | 382/232 |
| 2006/0072674 A1* | 4/2006 | Saha et al. | ................ | 375/240.25 |

FOREIGN PATENT DOCUMENTS

| | | |
|---|---|---|
| JP | 2005-102144 | 4/2005 |
| JP | 2006-31480 | 2/2006 |

* cited by examiner

*Primary Examiner* — Yogesh Paliwal
(74) *Attorney, Agent, or Firm* — Staas & Halsey LLP

(57) ABSTRACT

A moving-picture processing apparatus includes a plurality of decoding or encoding units, and a pre-fetch memory shared by the plurality of decoding or encoding units.

5 Claims, 17 Drawing Sheets

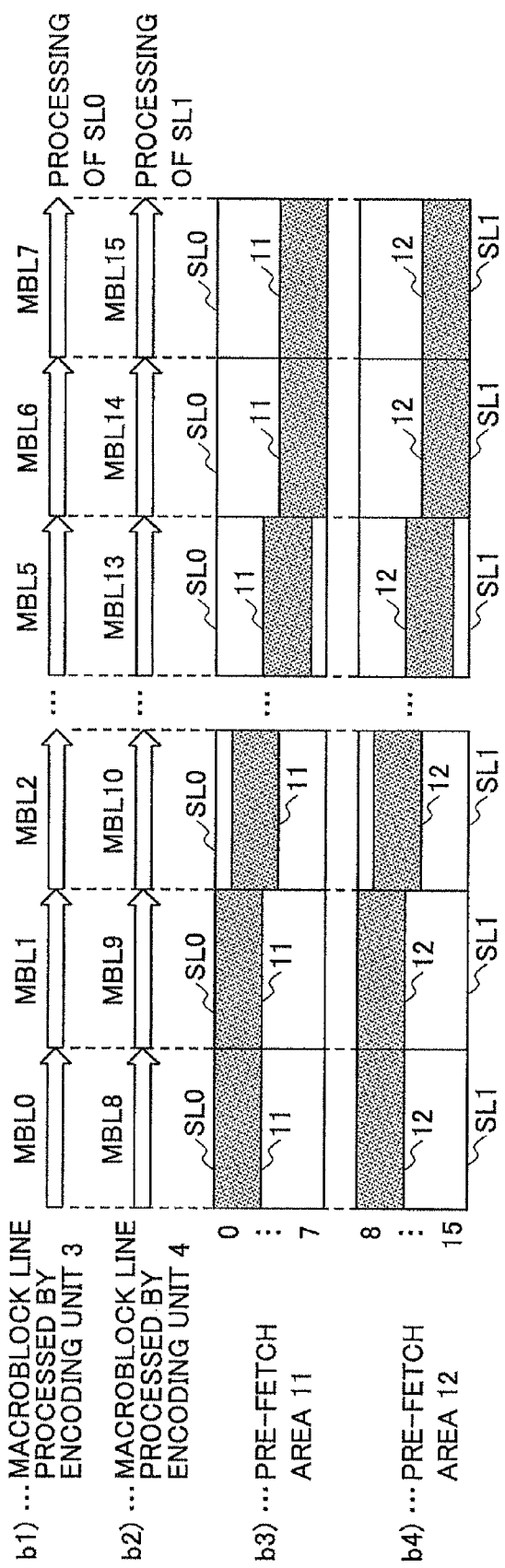

MOVING-PICTURE PROCESSING APPARATUS

CROSS-REFERENCE TO RELATED APPLICATIONS

The present application is based upon and claims the benefit of priority from the prior Japanese Patent Application No. 2006-238537 filed on Sep. 4, 2006, with the Japanese Patent Office, the entire contents of which are incorporated herein by reference.

BACKGROUND OF THE INVENTION

1. Field of the Invention

The present invention generally relates to an image processing apparatus, and particularly relates to a moving-picture processing apparatus provided with a pre-fetch memory for pre-fetching and storing a portion of a reference picture stored in an external memory.

2. Description of the Related Art

In a decoder or encoder using a moving-picture compression method such as MPEG (Moving Picture Experts Group), there is a need to store a reference picture in an external memory and to retrieve a rectangular portion of the reference picture stored in the external memory during a decoding process or encoding process. Depending on types of processes, multiple read accesses may need to be performed with respect to the same portion of the reference picture stored in the external memory. This is one of the causes that increase the amount of data transfer between the external memory and the decoder/encoder.

In order to avoid multiple read accesses with respect to the same portion of a reference picture stored in the external memory, a pre-fetch memory may be provided in a decoder or encoder to store a portion of the reference picture stored in the external memory in such a manner that the pre-fetched portion is updatable. With this configuration, the decoder or encoder can retrieve a necessary portion of the reference picture from the pre-fetch memory. This makes it possible to reduce the amount of data transfer between the external memory and the decoder/encoder.

[Patent Document 1] Japanese Patent Application Publication No. 2005-102144

[Patent Document 2] Japanese Patent Application Publication No. 2006-31480

SUMMARY OF THE INVENTION

According to one aspect of the embodiment of the present invention, a moving-picture processing apparatus has a plurality of decoding or encoding units. The pre-fetch memory is shared by the plurality of decoding or encoding units.

According to another aspect of the embodiment of the present invention, a moving-picture processing apparatus having a plurality of memories storing respective parts of a reference picture has a decoding or encoding unit, and a pre-fetch memory storing a portion of the reference picture. The pre-fetch memory is shared by the plurality of the memories.

BRIEF DESCRIPTION OF THE DRAWINGS

FIGS. 2A and 2B are drawings for explaining the detail of pre-fetch areas pre-fetched by the pre-fetch memories provided in the related-art MPEG encoder;

DESCRIPTION OF THE PREFERRED EMBODIMENTS

Figure 1:
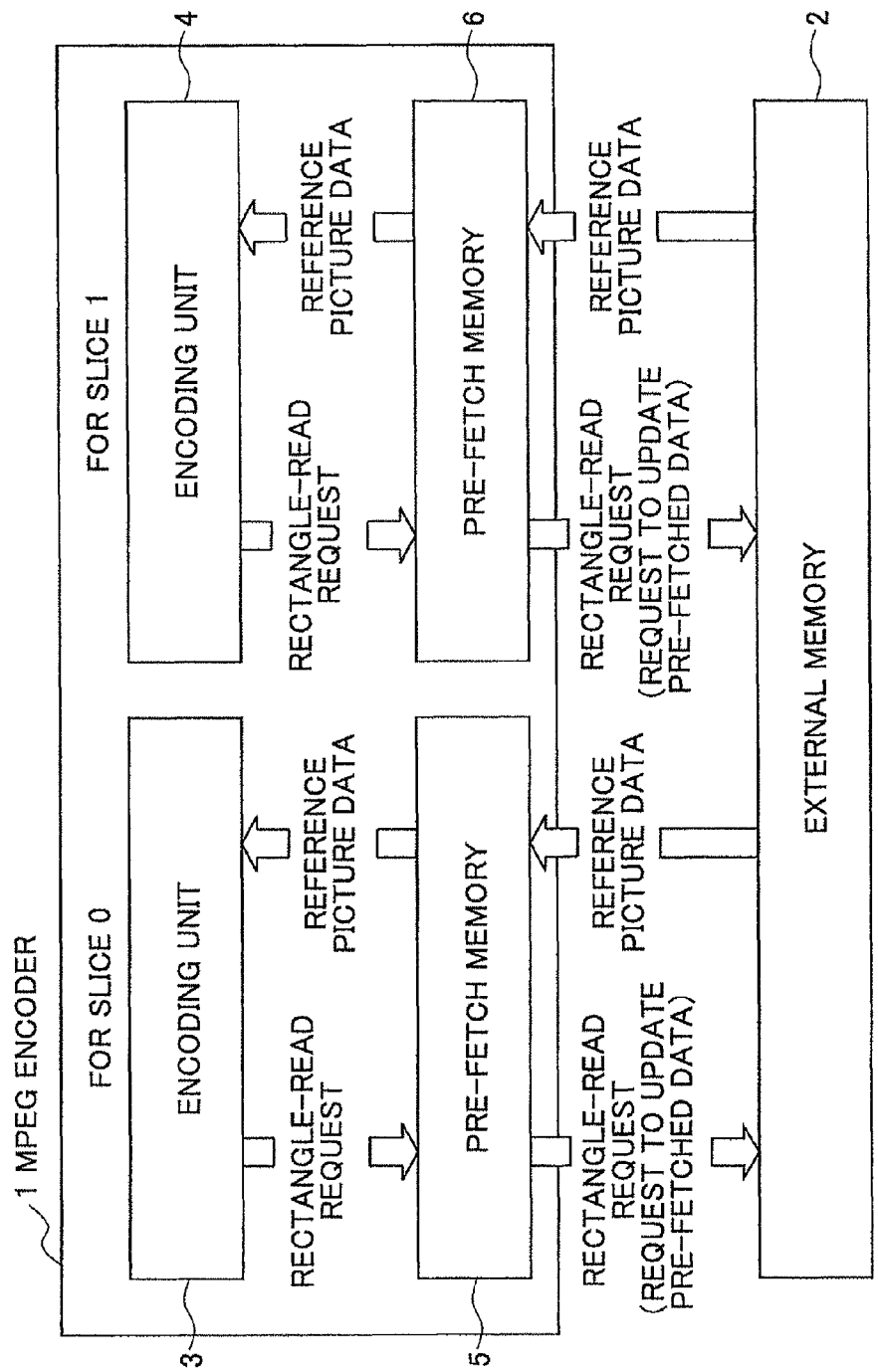
FIG. 1 is a drawing showing a related-art MPEG encoder together with an external memory.

FIG. 1 is a drawing showing a MPEG encoder together with an external memory. In FIG. 1, a MPEG encoder 1 compresses and encodes an image signal according to the MPEG standard to generate an MPEG stream. An external memory 2 stores a reference picture that is referred to by the MPEG encoder 1 to compute a motion vector.

In the MPEG encoder 1, encoding units 3 and 4 perform processing that is necessary to generate an MPEG stream. The encoding unit 3 is responsible for the upper half slice of the picture, and the encoding unit 4 is responsible for the lower half slice of the picture.

A pre-fetch memory 5 is provided for the encoding unit 3, and serves to pre-fetch and store a portion of the upper half slice of a reference picture stored in the external memory 2. A pre-fetch memory 6 is provided for the encoding unit 4, and serves to pre-fetch and store a portion of the lower half slice of a reference picture stored in the external memory 2.

In the MPEG encoder 1, the encoding unit 3 issues a request to read a rectangular portion (which may hereinafter be referred to as "a rectangle-read request") to the pre-fetch memory 5 when the encoding unit 3 uses a rectangular portion of the image stored in the pre-fetch memory 5 for the purpose of computing a motion vector. Further, the encoding unit 4 issues a rectangle-read request to the pre-fetch memory 6 when the encoding unit 4 uses a rectangular portion of the image stored in the pre-fetch memory 6 for the purpose of computing a motion vector.

Figure 2A:
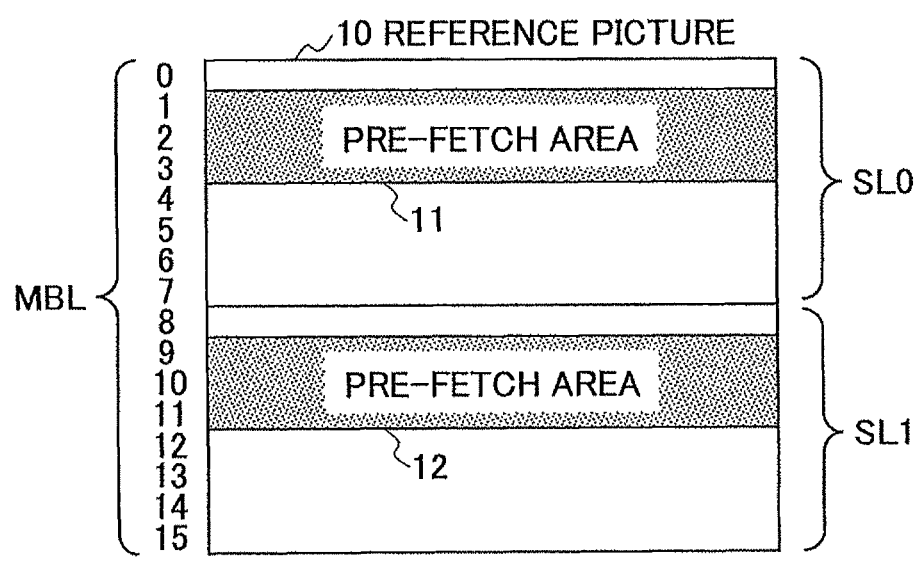

FIGS. 2A and 2B are drawings for explaining pre-fetch areas that are pre-fetched by the pre-fetch memories 5 and 6. FIG. 2A shows areas of a reference picture that are taken care of by the pre-fetch memories 5 and 6. FIG. 2B shows the transitions of pre-fetched areas that are pre-fetched by the pre-fetch memories 5 and 6.

In FIG. 2A, a reference picture 10 is stored in the external memory 2, and includes macroblock lines MBL0 through MBL15. The pre-fetch memory 5 covers a slice SL0 that is comprised of the 8 macroblock lines MBL0 through MBL7 of the reference picture 10. Three consecutive macroblock lines within the slice SL0 constitute a pre-fetch area 11.

The pre-fetch memory 6 covers a slice SL1 that is comprised of the 8 macroblock lines MBL8 through MBL15 of the reference picture 10. Three consecutive macroblock lines within the slice SL1 constitute a pre-fetch area 12.

In FIG. 2B, a letter designation (b1) illustrates the transitions of macroblock lines processed by the encoding unit 3 in the currently processed image, a letter designation (b2) illustrating the transitions of macroblock lines processed by the encoding unit 4 in the currently processed image, a letter designation (b3) illustrating the transitions of the pre-fetch area 11 pre-fetched from the slice SL0 by the pre-fetch memory 5, and a letter designation (b4) illustrating the transitions of the pre-fetch area 12 pre-fetched from the slice SL1 by the pre-fetch memory 6.

In the MPEG encoder 1, the encoding unit 4 processes the macroblock line MBL8 when the encoding unit 3 processes the macroblock line MBL0. In this case, the pre-fetch area 11 pre-fetched by the pre-fetch memory 5 is comprised of the macroblock lines MBL0 through MBL2, and the pre-fetch area 12 pre-fetched by the pre-fetch memory 6 is comprised of the macroblock lines MBL8 through MBL10.

Further, the encoding unit 4 processes the macroblock line MBL9 when the encoding unit 3 processes the macroblock line MBL1. In this case, the pre-fetch area 11 pre-fetched by the pre-fetch memory 5 is comprised of the macroblock lines MBL0 through MBL2, and the pre-fetch area 12 pre-fetched by the pre-fetch memory 6 is comprised of the macroblock lines MBL8 through MBL10.

The encoding unit 4 processes the macroblock line MBL10 when the encoding unit 3 processes the macroblock line MBL2. In this case, the pre-fetch area 11 pre-fetched by the pre-fetch memory 5 is shifted downward by one macroblock line, and is now comprised of the macroblock lines MBL1 through MBL3. By the same token, the pre-fetch area 12 pre-fetched by the pre-fetch memory 6 is shifted downward by one macroblock line, and is now comprised of the macroblock lines MBL9 through MBL11.

Each time the encoding unit 3 thereafter finishes processing one macroblock line, the pre-fetch area 11 pre-fetched by the pre-fetch memory 5 is shifted downward by one macroblock line. By the same token, each time the encoding unit 4 finishes processing one macroblock line, the pre-fetch area 12 pre-fetched by the pre-fetch memory 6 is shifted downward by one macroblock line.

The encoding unit 4 processes the macroblock line MBL13 when the encoding unit 3 processes the macroblock line MBL5. In this case, the pre-fetch area 11 pre-fetched by the pre-fetch memory 5 is comprised of the macroblock lines MBL4 through MBL6, and the pre-fetch area 12 pre-fetched by the pre-fetch memory 6 is comprised of the macroblock lines MBL12 through MBL14.

The encoding unit 4 processes the macroblock line MBL14 when the encoding unit 3 processes the macroblock line MBL6. In this case, the pre-fetch area 11 pre-fetched by the pre-fetch memory 5 is comprised of the macroblock lines MBL5 through MBL7, and the pre-fetch area 12 pre-fetched by the pre-fetch memory 6 is comprised of the macroblock lines MBL13 through MBL15.

The encoding unit 4 processes the macroblock line MBL15 when the encoding unit 3 processes the macroblock line MBL7. In this case, the pre-fetch area 11 pre-fetched by the pre-fetch memory 5 is comprised of the macroblock lines MBL5 through MBL7, and the pre-fetch area 12 pre-fetched by the pre-fetch memory 6 is comprised of the macroblock lines MBL13 through MBL15.

Figure 3:
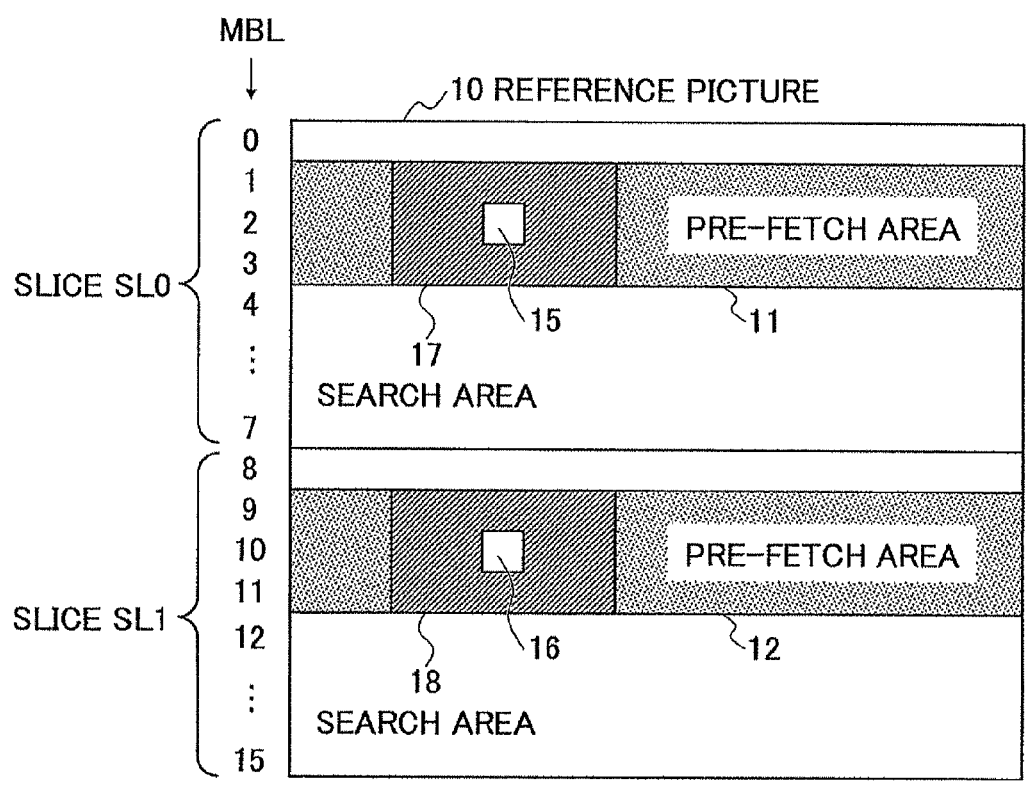
FIG. 3 is a drawing for explaining preferable pre-fetch areas of a reference picture that are pre-fetched by the pre-fetch memories provided in the related-art MPEG encoder.

FIG. 3 is a drawing for explaining preferable pre-fetch areas in the reference picture 10 that are fetched by the pre-fetch memories 5 and 6. In FIG. 3, a macroblock 15 is situated at the same position in the reference picture 10 as the macroblock that is currently processed by the encoding unit 3, and a macroblock 16 is situated at the same position in the reference picture 10 as the macroblock that is currently processed by the encoding unit 4.

Generally, the encoding units 3 and 4 compute motion vectors by use of a block matching method. The block-matching method searches for an image that is closest to the currently processed macroblock in a search area within the reference picture. In FIG. 3, a search area 17 is subjected to a search when the encoding unit 3 processes a macroblock situated at the same position in the processed picture as the macroblock 15, and a search area 18 is subjected to a search when the encoding unit 4 processes a macroblock situated at the same position in the processed picture as the macroblock 16.

In order to perform block-matching, the encoding unit 3 needs to retrieve the image data of the search area 17, so that the pre-fetch area 11 pre-fetched in the pre-fetch memory 5 for use by the encoding unit 3 preferably includes all the search area 17. By the same token, the encoding unit 4 needs to retrieve the image data of the search area 18, so that the pre-fetch area 12 pre-fetched in the pre-fetch memory 6 for use by the encoding unit 4 preferably includes all the search area 18.

Figure 4:
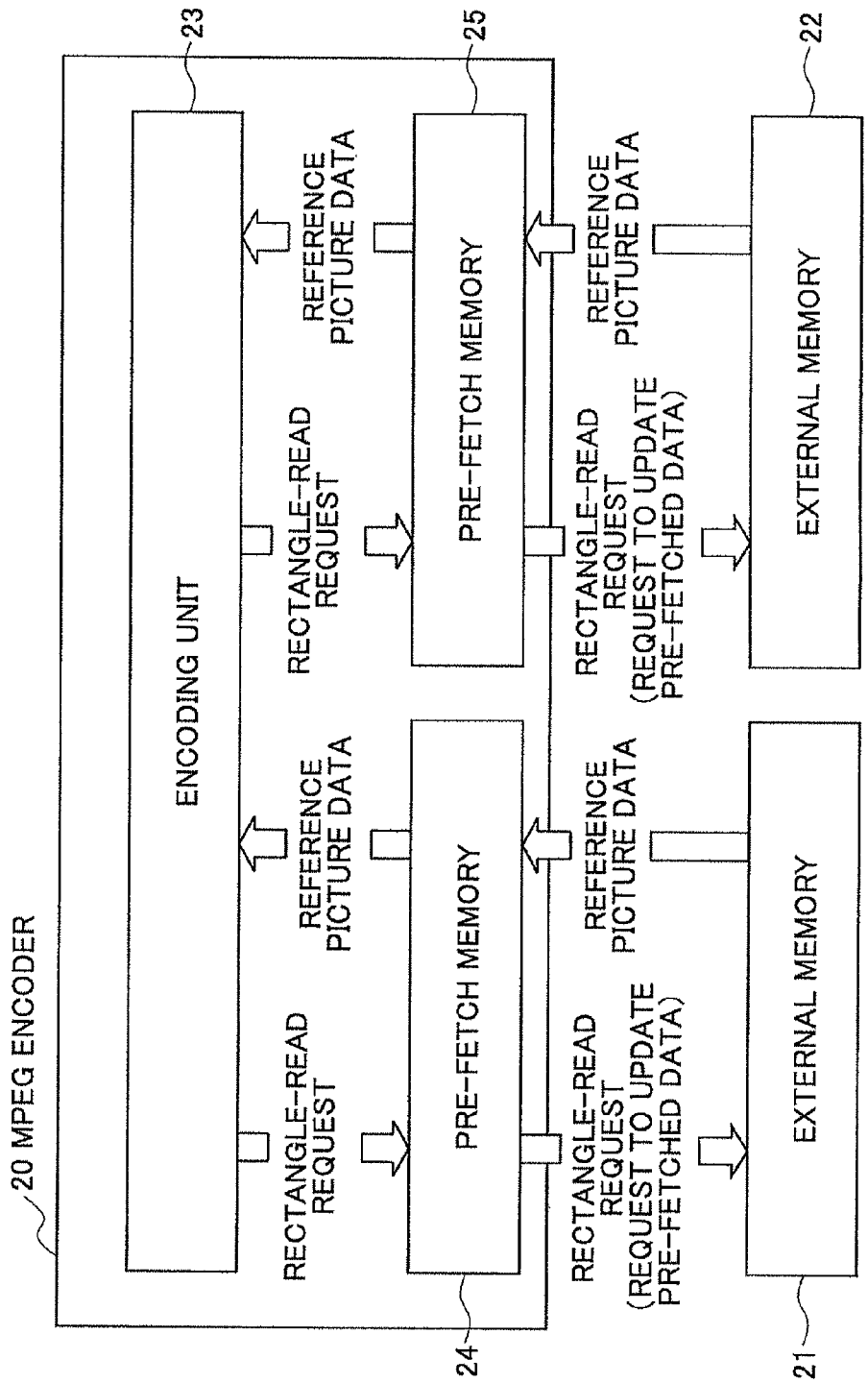
FIG. 4 is a drawing showing another related-art MPEG encoder together with an external memory.

FIG. 4 is a drawing showing another MPEG encoder together with an external memory. What is shown in FIG. 4 are a MPEG encoder 20 and external memories 21 and 22 for storing a reference picture that is referred to by the MPEG encoder 20 to compute a motion vector. The external memory 21 stores even-number lines of the reference picture, and the external memory 22 stores odd-number lines of the reference picture.

The MPEG encoder 20 includes an encoding unit 23 for performing computation necessary to generate an MPEG stream, a pre-fetch memory 24 for pre-fetching and storing a portion of the even-number lines of the reference picture stored in the external memory 21, and a pre-fetch memory 25 for pre-fetching and storing a portion of the odd-number lines of the reference picture stored in the external memory 22.

In the MPEG encoder 20, for the purpose of computing a motion vector in a rectangular area of the reference picture, the encoding unit 23 issues a rectangle-read request to the pre-fetch memory 24 with respect to the odd-number-line portion stored in the pre-fetch memory 24, and issues a rectangle-read request to the pre-fetch memory 25 with respect to the even-number-line portion stored in the pre-fetch memory 25.

Figure 5:
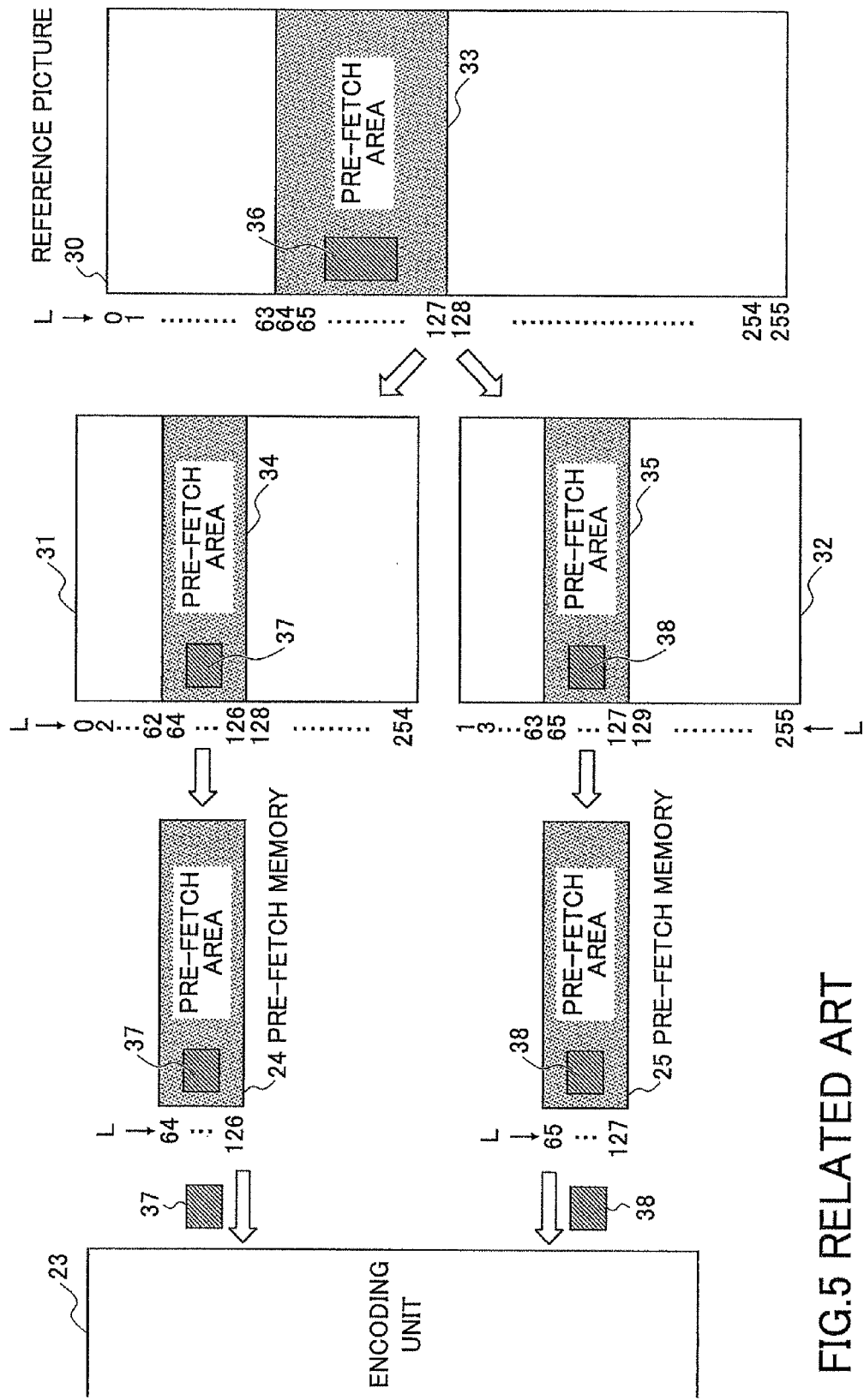
FIG. 5 is a drawing for explaining the detail of a read operation with respect to pre-fetch memories in such another related-art MPEG encoder.

FIG. 5 is a drawing for explaining the detail of a read operation with respect to the pre-fetch memories 24 and 25 in the MPEG encoder 20. What is shown in FIG. 5 includes a reference picture 30, an even-number-line reference picture 31 comprised of even-number lines L0, L2, ..., L254 of the reference picture 30, an odd-number-line reference picture 32 comprised of odd-number lines L1, L3, ..., L255 of the reference picture 30. The even-number-line reference picture 31 is stored in the external memory 21, and the odd-number-line reference picture 32 is stored in the external memory 22.

In this example, lines L64 through L127 of the reference picture 30 constitute a pre-fetch area 33. The even-number lines L64, L66, ..., and L126 are pre-fetched to the pre-fetch memory 24 as a pre-fetch area 34, and the odd-number lines L65, L67, ..., and L127 are pre-fetched to the pre-fetch memory 25 as a pre-fetch area 35.

When the encoding unit 23 needs a rectangular area 36 of the reference picture 30, the encoding unit 23 issues a rectangle-read request to the pre-fetch memory 24 with respect to an even-number-line portion 37 of the rectangular area 36, and issues a rectangle-read request to the pre-fetch memory 25 with respect to an odd-number-line portion 38 of the rectangular area 36.

As a result, the image data of the even-number-line portion 37 of the rectangular area 36 is read from the pre-fetch memory 24 and transferred to the encoding unit 23, and the image data of the odd-number-line portion 38 of the rectangular area 36 is read from the pre-fetch memory 25 and transferred to the encoding unit 23.

In the MPEG encoder 1, the pre-fetch memories 5 and 6 are provided for the encoding units 3 and 4, respectively, so that the total vertical size of the search area needed by the encoding units 3 and 4 is twice as large as that of an individual search area needed by each of the encoding units 3 and 4. That is, the total vertical size of the pre-fetch area pre-fetched by the pre-fetch memories 5 and 6 is twice as large as that of an individual pre-fetch area pre-fetched by each of the pre-fetch memories 5 and 6. This requires the total memory size of the pre-fetch memories 5 and 6 to be large, which gives rise to a problem in that the amount of data transfer between the external memory 2 and the pre-fetch memories 5 and 6 increases.

In the MPEG encoder 20, the pre-fetch memories 24 and 25 are provided for the external memories 21 and 22, respectively, so that the pre-fetch memory 24 stores an even-number-line portion of the pre-fetch area of the reference picture 30, and the pre-fetch memory 25 stores an odd-number-line portion of the pre-fetch area of the reference picture 30. With this configuration, the encoding unit 23 needs to issue a rectangle-read request separately for each of the pre-fetch memories 24 and 25, which gives rise to a problem in that the reading of image data is inefficient.

Accordingly, there is a need for a moving-picture processing apparatus in which the amount of data transfer between an external memory and a pre-fetch memory can be reduced. There is also a need for a moving-picture processing apparatus in which the reading of image data from a pre-fetch memory can efficiently be performed.

In the following, embodiments of the present invention will be described with reference to the accompanying drawings.

Figure 6:
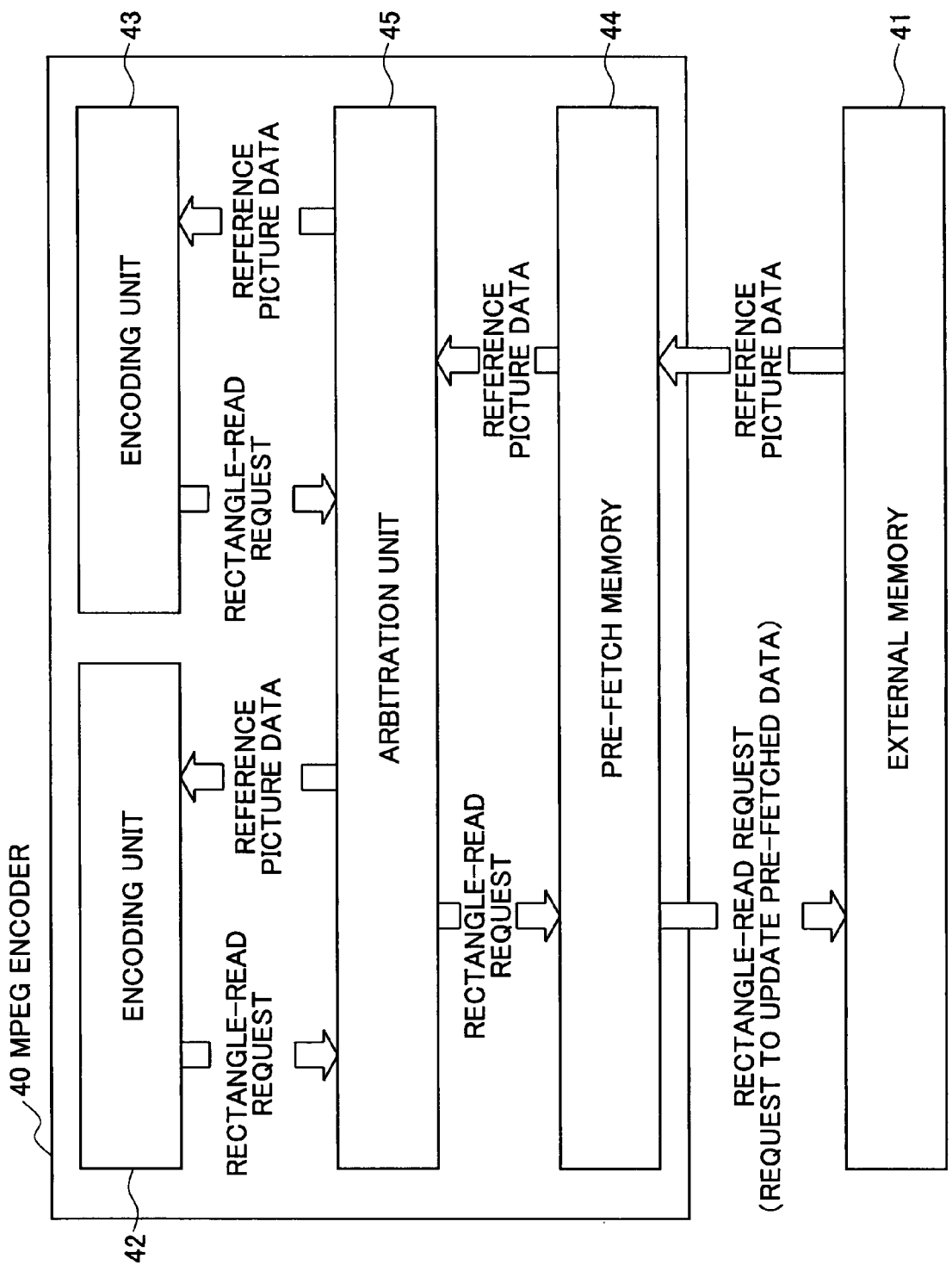
FIG. 6 is a drawing showing an MPEG encoder that is an embodiment of a moving-picture processing apparatus according a first principle together with an external memory.

FIG. 6 is a drawing showing an MPEG encoder that is a first embodiment of a moving-picture processing apparatus with an external memory. In FIG. 6, an MPEG encoder 40 that is an embodiment of a moving-picture processing apparatus according to the first principle compresses and encodes an image signal according to the MPEG standard to generate an MPEG stream. An external memory 41 stores a reference picture that is referred to by the MPEG encoder 40 to compute a motion vector.

The MPEG encoder 40 includes encoding units 42 and 43 for performing computation necessary to generate an MPEG stream. The encoding units 42 and 43 perform the parallel processing of adjacent macroblock lines situated one over the other or the parallel processing of multiple images belonging to a common reference picture, or selectively perform the parallel processing of adjacent macroblock lines situated one over the other and the parallel processing of multiple images belonging to a common reference picture.

A pre-fetch memory 44 pre-fetches and stores a portion of the reference picture stored in the external memory 41. An arbitration unit 45 arbitrates between the transfer of a rectangle-read request issued by the encoding unit 42 to the pre-fetch memory 44 and the transfer of a rectangle-read request issued by the encoding unit 43 to the pre-fetch memory 44.

Further, each of the encoding units 42 and 43 issues a rectangle-read request to the arbitration unit 45 when it needs to use, as a reference image, a rectangular portion of the image stored in the pre-fetch memory 44. This rectangle-read request includes information indicative of the position and size of the rectangular portion that is to be retrieved.

Figure 7:
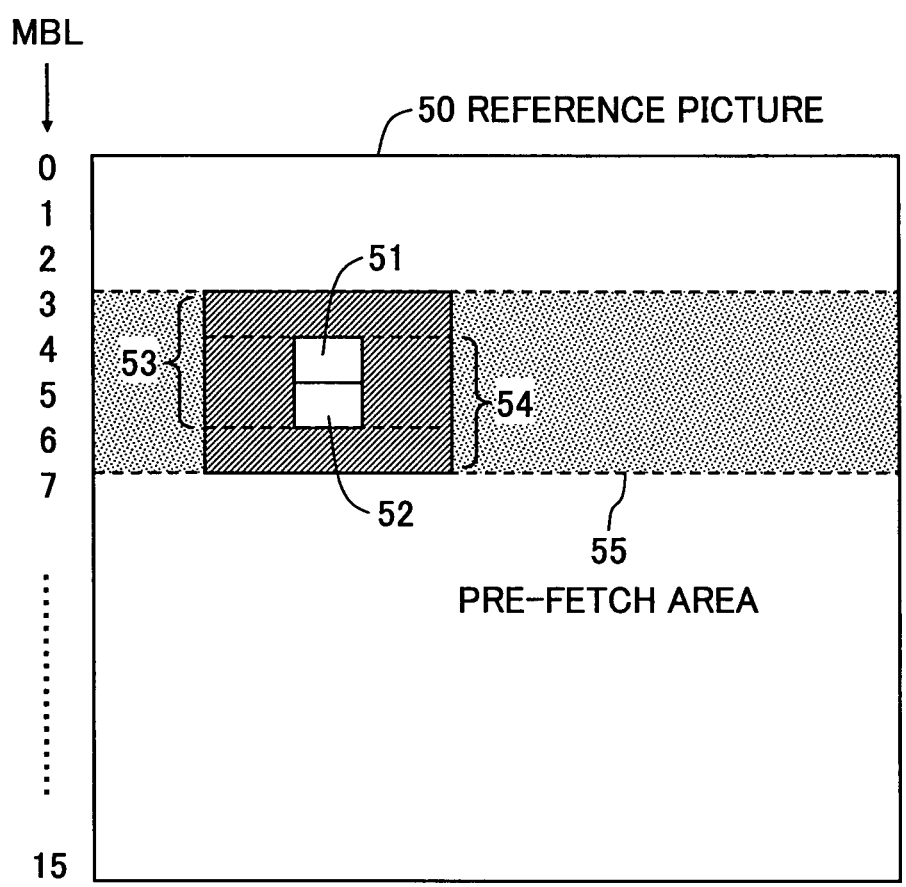
FIG. 7 is a drawing for explaining a preferable pre-fetch area of a reference picture that is fetched by a pre-fetch memory when two encoding units perform the parallel processing of adjacent macro-block lines situated one over the other in the embodiment of a moving-picture processing apparatus according to the first principle.

FIG. 7 is a drawing for explaining a preferable pre-fetch area in the reference picture that is fetched by the pre-fetch memory 44 when the encoding units 42 and 43 perform the parallel processing of adjacent macroblock lines situated one over the other. In FIG. 7, a reference picture 50 is stored in the external memory 41. A macroblock 51 is situated at the same position in the reference picture 50 as the macroblock that is currently processed by the encoding unit 42, and a macroblock 52 is situated at the same position in the reference picture 50 as the macroblock that is currently processed by the encoding unit 43.

A search area 53 is subjected to a search that is performed by the encoding unit 42 for the purpose of performing block-matching with respect to the macroblock situated at the same position in the processed image as the macroblock 51, and a search area 54 is subjected to a search that is performed by the encoding unit 43 for the purpose of performing block-matching with respect to the macroblock situated at the same position in the processed image as the macroblock 52.

In this example, the vertical size of the search areas 53 and 54 searched by the encoding units 42 and 43 may be equal to three macroblocks as in the case of the encoding units 3 and 4 provided in the MPEG encoder 1 shown in FIG. 3. With this arrangement, since the encoding units 42 and 43 perform the parallel processing of adjacent macroblock lines situated one over the other, the search areas 53 and 54 searched by the encoding units 42 and 43 are contained in an area extending over 4 macroblocks in the vertical direction.

When the encoding unit 42 processes a macroblock line MBL4, and the encoding unit 43 processes macroblock line MBL5, for example, the search area 53 searched by the encoding unit 42 is comprised of the macroblock lines MBL3 through MBL5 in the vertical direction, and the search area 54 searched by the encoding unit 43 is comprised of the macroblock lines MBL4 through MBL6 in the vertical direction. In this case, a pre-fetch area 55 that should be pre-fetched by the pre-fetch memory 44 is comprised of 4 macroblock lines that are the macroblock lines MBL3 through MBL6.

When the encoding units 42 and 43 perform the parallel processing of adjacent macroblock lines situated one over the other in this manner, despite the fact that the vertical size of the search areas 53 and 54 searched by the encoding units 42 and 43 is equal to three macroblock lines, the vertical size of the pre-fetch area 55 that needs to be pre-fetched by the pre-fetch memory 44 is not equal to 6 macroblock lines that is twice as large as the vertical size of the search areas 53 and 54 searched by the encoding units 42 and 43, but is properly 4 macroblock lines that is smaller than twice the vertical size of the search areas 53 and 54 searched by the encoding units 42 and 43.

Figure 8:
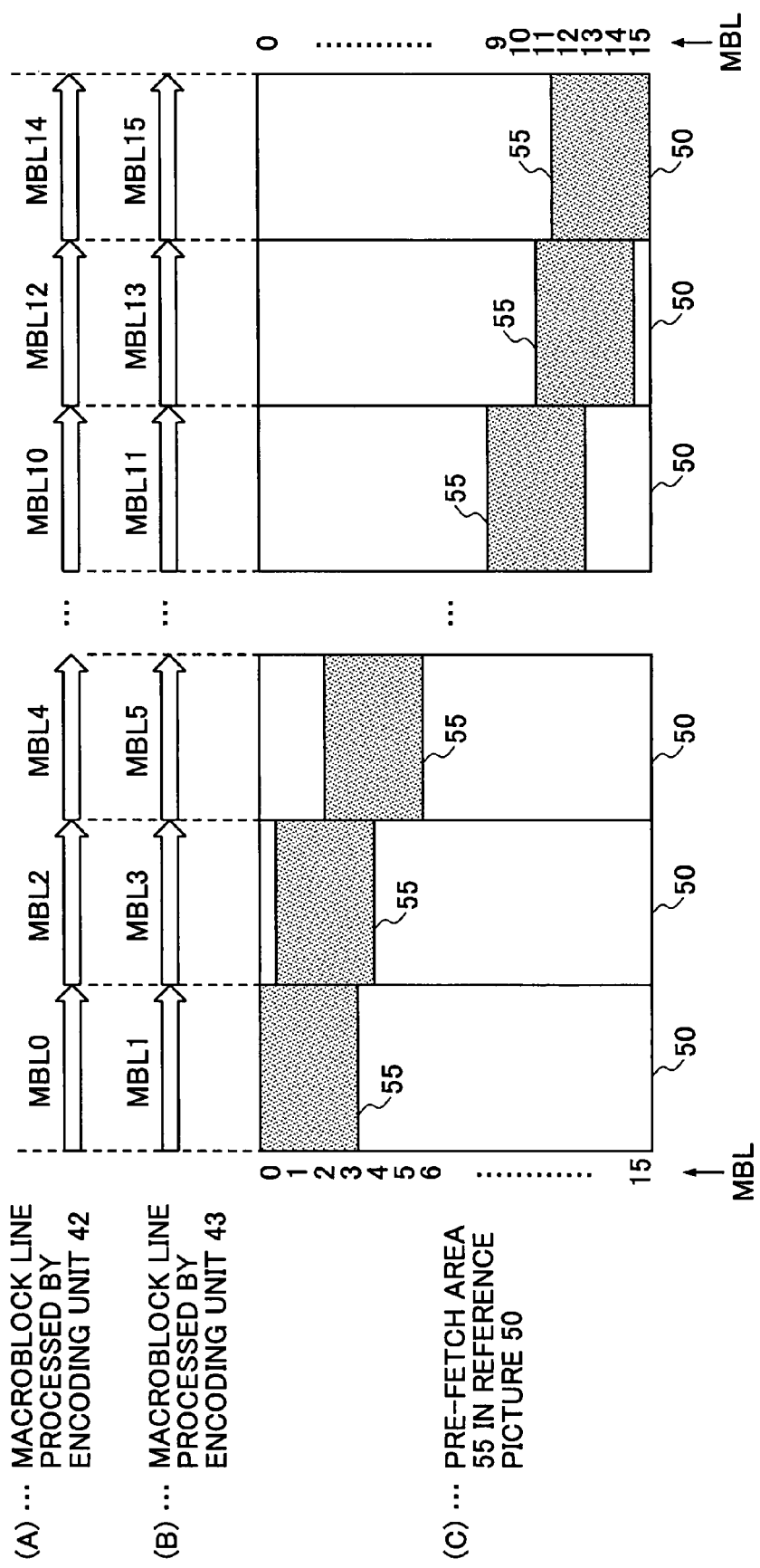
FIG. 8 is a drawing for explaining an example of a pre-fetch area of a reference picture that is fetched by a pre-fetch memory when two encoding units perform the parallel processing of adjacent macro-block lines situated one over the other in the embodiment of a moving-picture processing apparatus according to the first principle.

FIG. 8 is a drawing for explaining specific examples of pre-fetch areas pre-fetched by the pre-fetch memory 44 when the encoding units 42 and 43 perform the parallel processing of adjacent macroblock lines situated one over the other. A letter designation (A) illustrates, the transitions of a macroblock line processed by the encoding unit 42, and a letter designation (B) illustrates the transitions of a macroblock line processed by the encoding unit 43. Further, a letter designation (C) illustrates the transitions of the pre-fetch area 55 in the reference picture 50 as pre-fetched by the pre-fetch memory 44.

When the encoding units 42 and 43 perform the parallel processing of adjacent macroblock lines situated one over the other, the encoding unit 42 may first process the macroblock line MBL0 as shown in FIG. 8-(A), and the encoding unit 43 may first process the macroblock line MBL1 as shown in FIG. 8-(B). In this case, the pre-fetch area 55 pre-fetched by the pre-fetch memory 44 is comprised of the macroblock lines MBL0 through MBL3, for example.

When the encoding unit 42 processes the macroblock line MBL2, and the encoding unit 43 processes the macroblock line MBL3, the pre-fetch area 55 pre-fetched by the pre-fetch memory 44 is comprised of the macroblock lines MBL1 through MBL4.

When the encoding unit 42 processes the macroblock line MBL4, and the encoding unit 43 processes the macroblock line MBL5, the pre-fetch area 55 pre-fetched by the pre-fetch memory 44 is comprised of the macroblock lines MBL3 through MBL6.

Each time the encoding units 42 and 43 thereafter finish processing one macroblock line, the pre-fetch area 55 pre-fetched by the pre-fetch memory 44 is shifted downward by two macroblock lines. When the encoding unit 42 processes the macroblock line MBL10, and the encoding unit 43 processes the macroblock line MBL11, the pre-fetch area 55 pre-fetched by the pre-fetch memory 44 is comprised of the macroblock lines MBL9 through MBL12.

When the encoding unit 42 processes the macroblock line MBL12, and the encoding unit 43 processes the macroblock line MBL13, the pre-fetch area 55 pre-fetched by the pre-fetch memory 44 is comprised of the macroblock lines MBL11 through MBL14.

When the encoding unit 42 processes the macroblock line MBL14, and the encoding unit 43 processes the macroblock line MBL15, the pre-fetch area 55 pre-fetched by the pre-fetch memory 44 is comprised of the macroblock lines MBL12 through MBL15.

Figure 9:
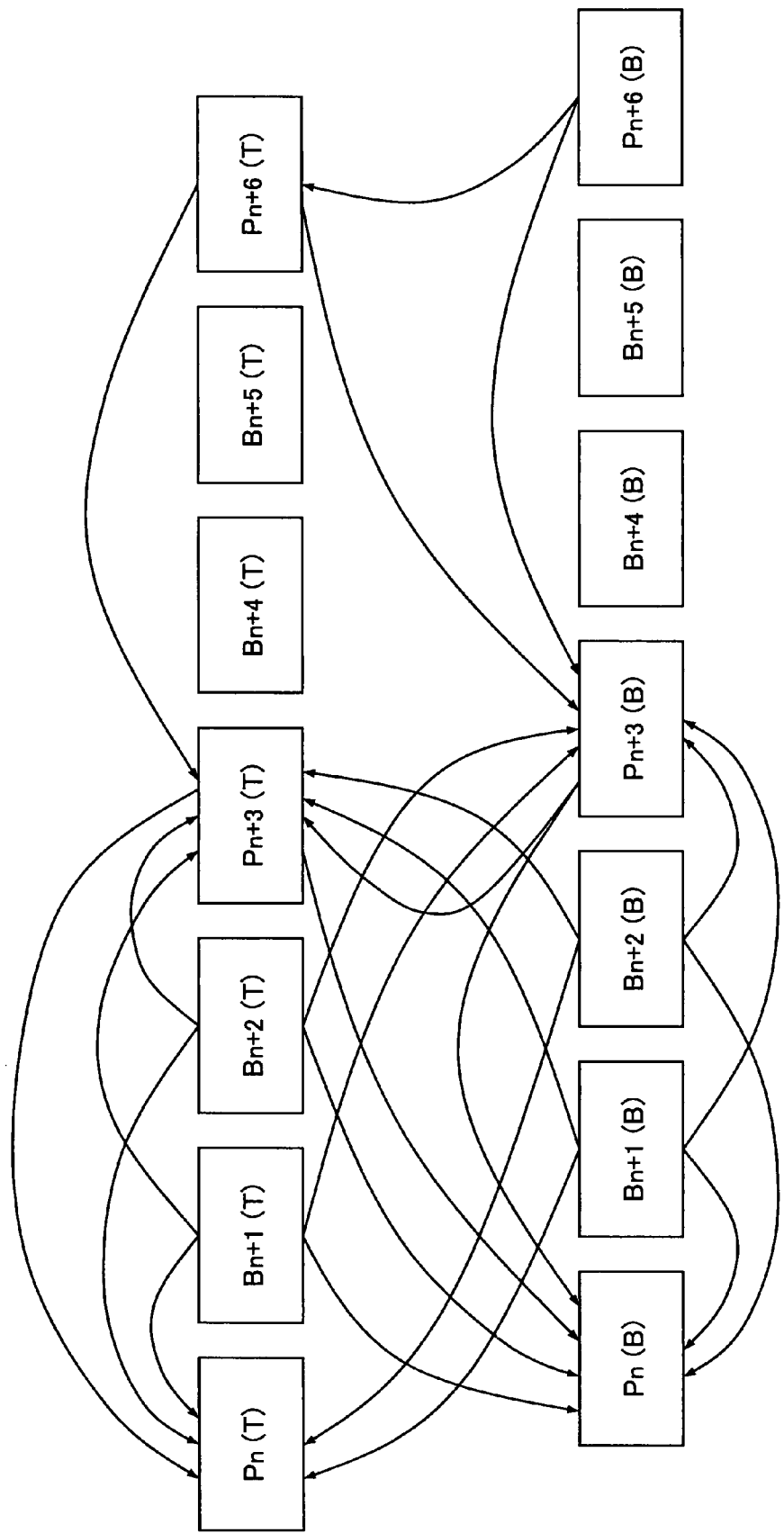
FIG. 9 is a drawing showing a portion of an MPEG stream having a field structure.

FIG. 9 is a drawing showing a portion of an MPEG stream having a field structure. In the encoding of an image signal having a field structure, two reference pictures are necessary when encoding a P field picture. When a Pn+3 top field picture is to be encoded, the decoded pictures of a Pn top field and a Pn bottom field are referred to. When a Pn+3 bottom field picture is to be encoded, the decoded pictures of the Pn+3 top field and the Pn bottom field are referred to In FIG. 9 and FIG. 10, a top field is indicated by (T), and a bottom field is indicated by (B).

When a Pn+6 top field picture is to be encoded, the decoded pictures of a Pn+3 top field and a Pn+3 bottom field are referred to. When a Pn+6 bottom field picture is to be encoded, the decoded pictures of the Pn+6 top field and the Pn+3 bottom field are referred to When a B-field picture is to be encoded, on the other hand, the number of reference pictures needed is four. When a Bn+1 top field picture, a Bn+1 bottom field picture, a Bn+2 top field picture, and a Bn+2 bottom field picture are to be encoded, for example, the decoded pictures of a Pn+3 top field, a Pn top field, a Pn+3 bottom field, and a Pn bottom field are referred to.

Figure 10:
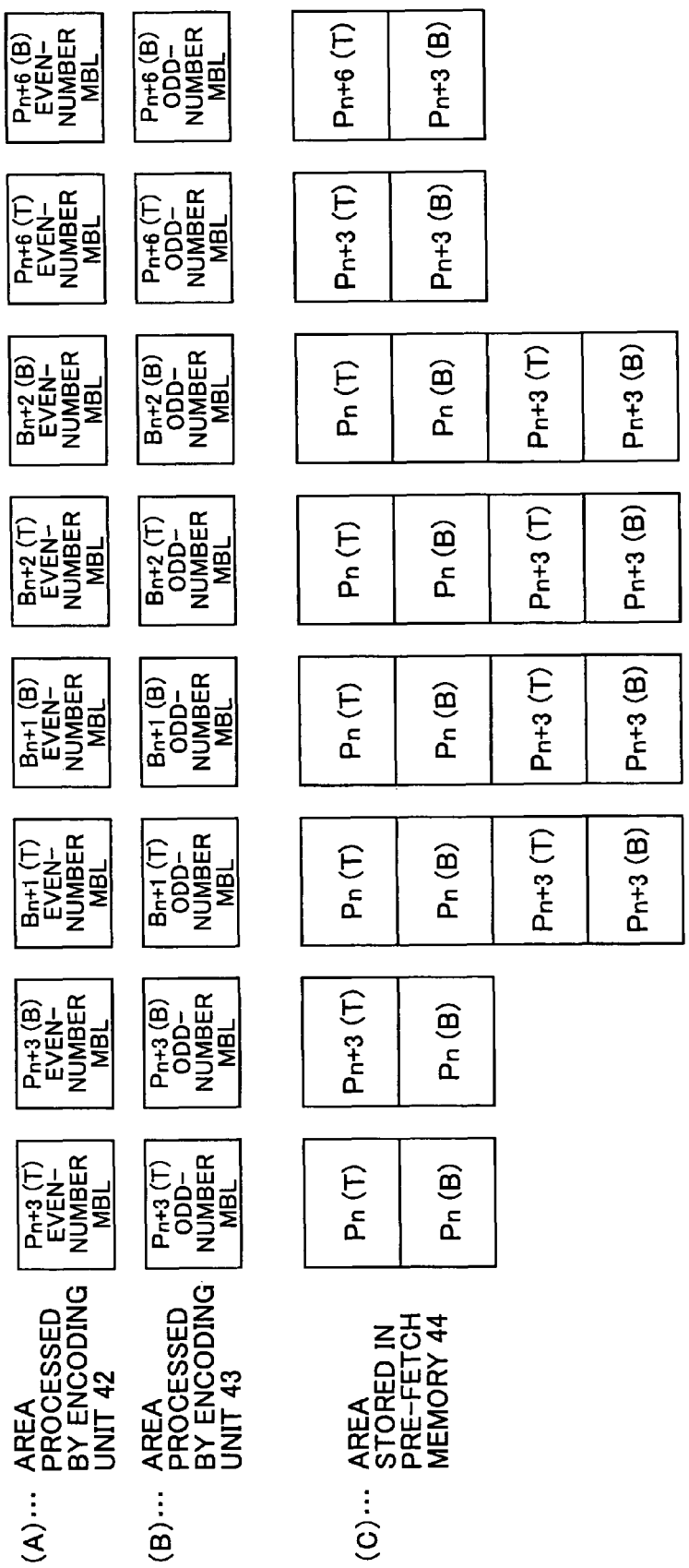
FIG. 10 is a drawing showing a pre-fetch area pre-fetched by the pre-fetch memory and a first preferable method of allocating processed areas to the two encoding units when encoding Pn+3 top/bottom field pictures, Bn+1 top/bottom field pictures, Bn+2 top/bottom field pictures, and Pn+6 top/bottom field pictures shown in FIG. 9.

FIG. 10 is a drawing showing a pre-fetch area pre-fetched by the pre-fetch memory 44 and a first preferable method of allocating processed areas to the encoding units 42 and 43 when encoding Pn+3 top/bottom field pictures, Bn+1 top/bottom field pictures, Bn+2 top/bottom field pictures, and Pn+6 top/bottom field pictures shown in FIG. 9. In this first allocation method, the encoding units 42 and 43 perform the parallel processing of adjacent macroblock lines situated one over the other regardless of pictures.

Namely, this first allocation method is configured such that the encoding unit 42 is allocated with the even-number macroblock lines of the Pn+3 top field picture, the Pn+3 bottom field picture, the Bn+1 top field picture, the Bn+1 bottom field picture, the Bn+2 top field picture, the Bn+2 bottom field picture, the Pn+6 top field picture, and the Pn+6 bottom field picture.

Further, the encoding unit 43 is allocated with the odd-number macroblock lines of the Pn+3 top field picture, the Pn+3 bottom field picture, the Bn+1 top field picture, the Bn+1 bottom field picture, the Bn+2 top field picture, the Bn+2 bottom field picture, the Pn+6 top field picture, and the Pn+6 bottom field picture.

The encoding of the even-number macroblock lines of the Pn+3 top field picture and the encoding of the odd-number macroblock lines of the Pn+3 top field picture are performed in a parallel manner by the encoding unit 42 and the encoding unit 43, respectively. In this case, the pre-fetch memory 44 stores a portion of the decoded pictures of a Pn top field and a Pn bottom field.

The encoding of the even-number macroblock lines of the Pn+3 bottom field picture and the encoding of the odd-number macroblock lines of the Pn+3 bottom field picture are performed in a parallel manner by the encoding unit 42 and the encoding unit 43, respectively. In this case, the pre-fetch memory 44 stores a portion of the decoded pictures of the Pn+3 top field and the Pn bottom field.

The encoding of the even-number macroblock lines of the Bn+1 top field picture and the encoding of the odd-number macroblock lines of the Bn+1 top field picture are then performed in a parallel manner by the encoding unit 42 and the encoding unit 43, respectively. In this case, the pre-fetch memory 44 stores a portion of the decoded pictures of the Pn top field, the Pn bottom field, the Pn+3 top field, and the Pn+3 bottom field.

The encoding of the even-number macroblock lines of the Bn+1 bottom field picture and the encoding of the odd-number macroblock lines of the Bn+1 bottom field picture are then performed in a parallel manner by the encoding unit 42 and the encoding unit 43, respectively. In this case, the pre-fetch memory 44 stores a portion of the decoded pictures of the Pn top field, the Pn bottom field, the Pn+3 top field, and the Pn+3 bottom field.

The encoding of the even-number macroblock lines of the Bn+2 top field picture and the encoding of the odd-number macroblock lines of the Bn+2 top field picture are then performed in a parallel manner by the encoding unit 42 and the encoding unit 43, respectively. In this case, the pre-fetch memory 44 stores a portion of the decoded pictures of the Pn top field, the Pn bottom field, the Pn+3 top field, and the Pn+3 bottom field.

The encoding of the even-number macroblock lines of the Bn+2 bottom field picture and the encoding of the odd-number macroblock lines of the Bn+2 bottom field picture are then performed in a parallel manner by the encoding unit 42 and the encoding unit 43, respectively. In this case, the pre-fetch memory 44 stores a portion of the decoded pictures of the Pn top field, the Pn bottom field, the Pn+3 top field, and the Pn+3 bottom field.

The encoding of the even-number macroblock lines of the Pn+6 top field picture and the encoding of the odd-number macroblock lines of the Pn+6 top field picture are then performed in a parallel manner by the encoding unit 42 and the encoding unit 43, respectively. In this case, the pre-fetch memory 44 stores a portion of the decoded pictures of the Pn+3 top field and the Pn+3 bottom field.

The encoding of the even-number macroblock lines of the Pn+6 bottom field picture and the encoding of the odd-number macroblock lines of the Pn+6 bottom field picture are then performed in a parallel manner by the encoding unit 42 and the encoding unit 43, respectively. In this case, the pre-fetch memory 44 stores a portion of the decoded pictures of the Pn+6 top field and the Pn+3 bottom field.

Figure 11:
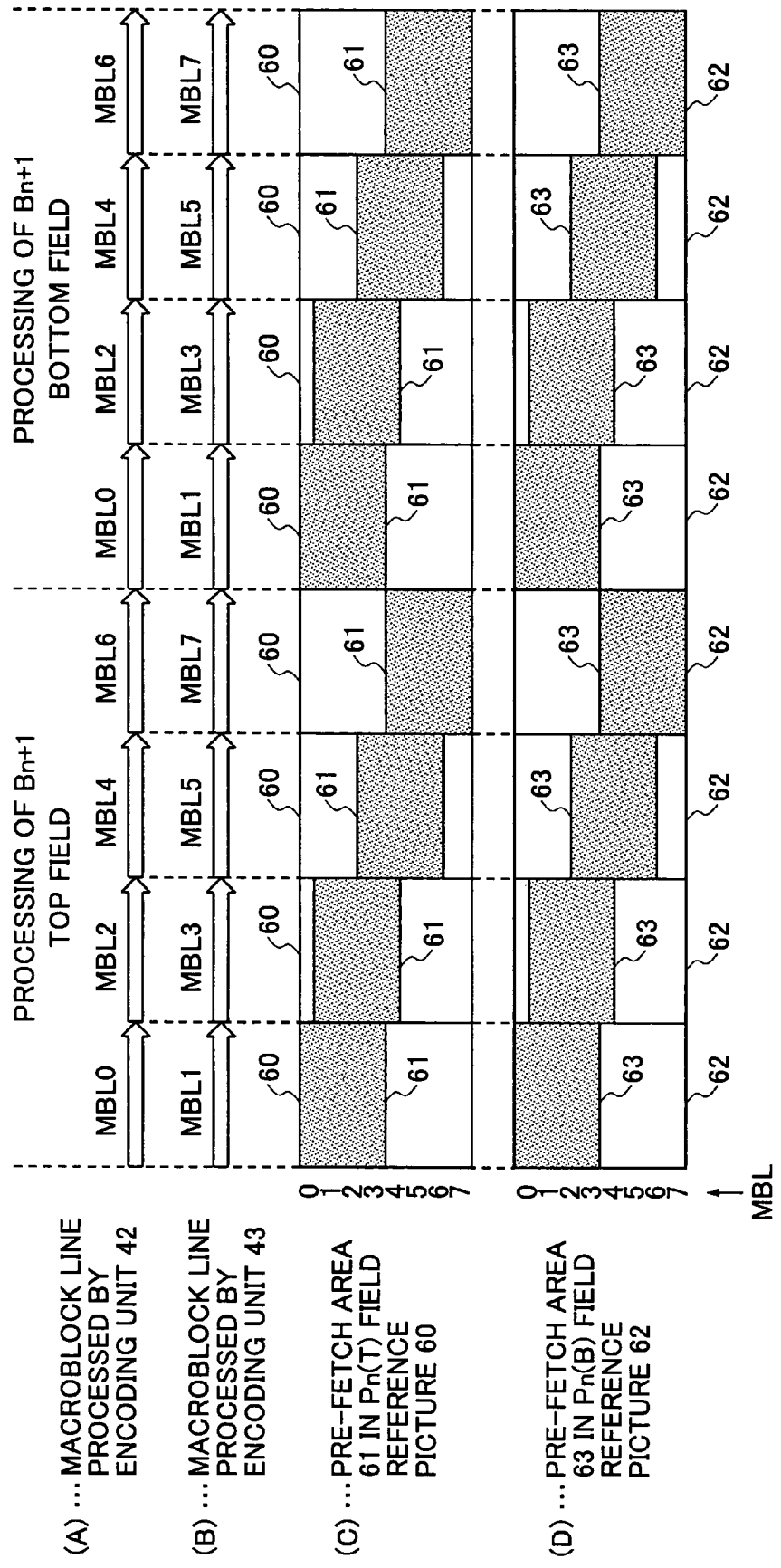
FIG. 11 is a drawing showing the transitions of a pre-fetch area pre-fetched by the pre-fetch memory and the transitions of areas processed by the two encoding units when the Bn+1 top/bottom fields shown in FIG. 9 are encoded by use of the first allocation method shown in FIG. 10.

FIG. 11 is a drawing showing the transitions of a pre-fetch area pre-fetched by the pre-fetch memory 44 and the transitions of areas processed by the encoding units 42 and 43 when the Bn+1 top/bottom fields shown in FIG. 9 are encoded by use of the first allocation method shown in FIG. 10.

In FIG. 11, a letter designation (A) illustrates the transitions of a macroblock line processed by the encoding unit 42, a letter designation (B) illustrating the transitions of a macroblock line processed by the encoding unit 43, a letter designation (C) illustrating the transitions of a pre-fetch area pre-fetched by the pre-fetch memory 44 from the reference picture of a Pn top field, and a letter designation (D) illustrating the transitions of a pre-fetch area pre-fetched by the pre-fetch memory 44 from the reference picture of a Pn bottom field.

FIG. 11 also shows a Pn top field reference picture 60, a pre-fetch area 61 in the Pn top field reference picture 60 pre-fetched by the pre-fetch memory 44, a Pn bottom field reference picture 62, and a pre-fetch area 63 in the Pn bottom field reference picture 62 pre-fetched by the pre-fetch memory 44.

In FIG. 11, illustration is omitted with respect to the transitions of a pre-fetch area of the Pn+3 top field reference picture pre-fetched by the pre-fetch memory 44 and the transitions of a pre-fetch area of the Pn+3 bottom field reference picture. These transitions are the same as those shown in FIGS. 11-(C) and (D).

Figure 12:
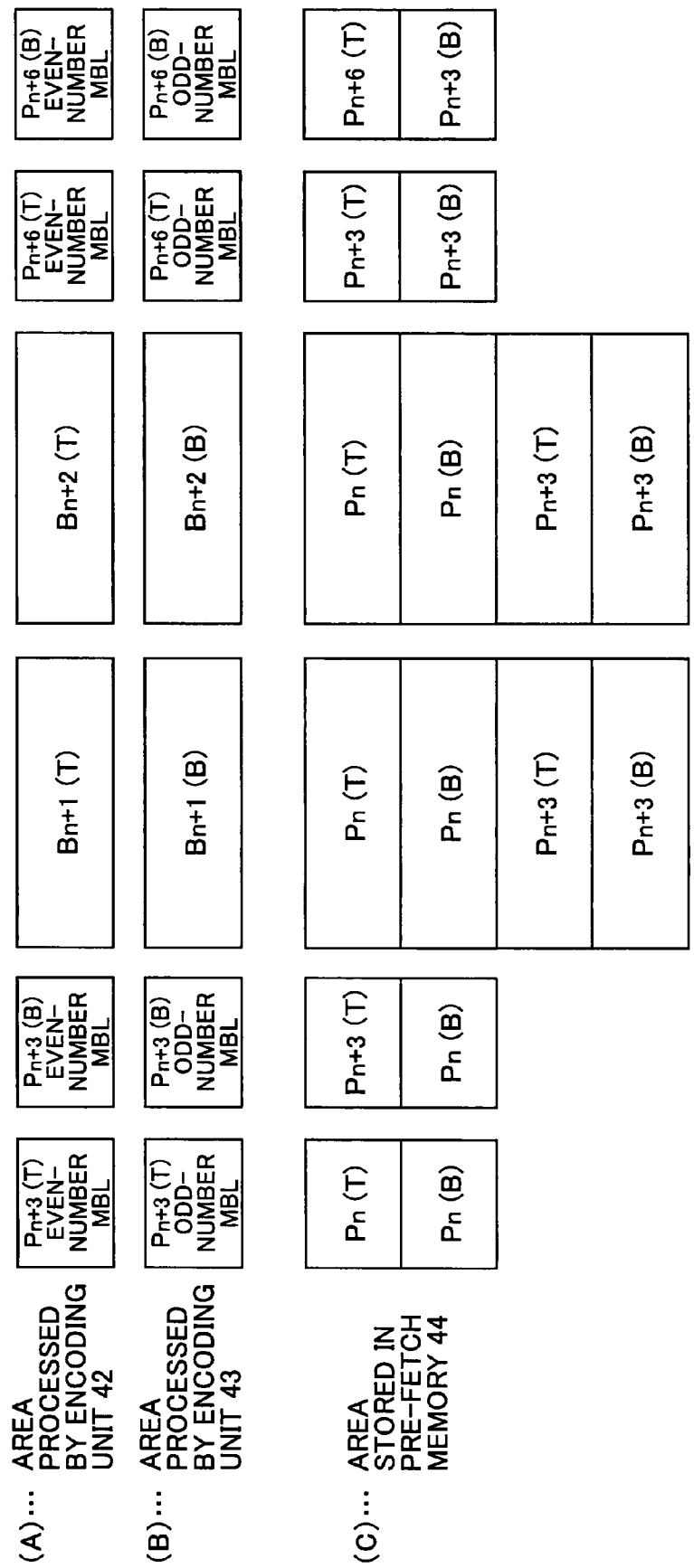
FIG. 12 is a drawing showing a pre-fetch area pre-fetched by the pre-fetch memory and a second preferable method of allocating processed areas to the two encoding units when encoding Pn+3 top/bottom field pictures, Bn+1 top/bottom field pictures, Bn+2 top/bottom field pictures, and Pn+6 top/bottom field pictures shown in FIG. 9.

FIG. 12 is a drawing showing a pre-fetch area pre-fetched by the pre-fetch memory 44 and a second preferable method of allocating processed areas to the encoding units 42 and 43 when encoding Pn+3 top/bottom field pictures, Bn+1 top/bottom field pictures, Bn+2 top/bottom field pictures, and Pn+6 top/bottom field pictures shown in FIG. 9.

This second allocation method is configured such that the encoding units 42 and 43 are switched between the parallel processing of adjacent macroblock lines situated one over the other and the parallel processing of multiple images corresponding to a common reference picture. Specifically, the encoding units 42 and 43 perform the parallel processing of adjacent macroblock lines situated one over the other when the Pn+3 top/bottom field pictures and Pn+6 top/bottom field pictures are to be encoded, and the encoding units 42 and 43 perform the parallel processing of a top field picture and a bottom field picture when the Bn+1 top/bottom field pictures and Bn+2 top/bottom field pictures are to be encoded.

Namely, this second allocation method is configured such that the encoding unit 42 is allocated with the even-number macroblock lines of the Pn+3 top field picture, the even-number macroblock lines of the Pn+3 bottom field picture, the Bn+1 top field picture, the Bn+2 top field picture, the even-number macroblock lines of the Pn+6 top field picture, and the even-number macroblock lines of the Pn+6 bottom field picture.

Further, the encoding unit 43 is allocated with the odd-number macroblock lines of the Pn+3 top field picture, the odd-number macroblock lines of the Pn+3 bottom field picture, the Bn+1 bottom field picture, the Bn+2 bottom field picture, the odd-number macroblock lines of the Pn+6 top field picture, and the odd-number macroblock lines of the Pn+6 bottom field picture.

The encoding of the even-number macroblock lines of the Pn+3 top field picture and the encoding of the odd-number macroblock lines of the Pn+3 top field picture are performed in a parallel manner by the encoding unit 42 and the encoding unit 43, respectively. In this case, the pre-fetch memory 44 stores a portion of the decoded pictures of a Pn top field and a Pn bottom field.

The encoding of the even-number macroblock lines of the Pn+3 bottom field picture and the encoding of the odd-number macroblock lines of the Pn+3 bottom field picture are performed in a parallel manner by the encoding unit 42 and the encoding unit 43, respectively. In this case, the pre-fetch memory 44 stores a portion of the decoded pictures of the Pn+3 top field and the Pn bottom field.

The encoding of the Bn+1 top field picture and the encoding of the Bn+1 bottom field picture are then performed in a parallel manner by the encoding unit 42 and the encoding unit 43, respectively. In this case, the pre-fetch memory 44 stores a portion of the decoded pictures of the Pn top field, the Pn bottom field, the Pn+3 top field, and the Pn+3 bottom field.

The encoding of the Bn+2 top field picture and the encoding of the Bn+2 bottom field picture are then performed in a parallel manner by the encoding unit 42 and the encoding unit 43, respectively. In this case, the pre-fetch memory 44 stores a portion of the decoded pictures of the Pn top field, the Pn bottom field, the Pn+3 top field, and the Pn+3 bottom field.

The encoding of the even-number macroblock lines of the Pn+6 top field picture and the encoding of the odd-number macroblock lines of the Pn+6 top field picture are then performed in a parallel manner by the encoding unit 42 and the encoding unit 43, respectively. In this case, the pre-fetch memory 44 stores a portion of the decoded pictures of the Pn+3 top field and the Pn+3 bottom field.

The encoding of the even-number macroblock lines of the Pn+6 bottom field picture and the encoding of the odd-number macroblock lines of the Pn+6 bottom field picture are then performed in a parallel manner by the encoding unit 42 and the encoding unit 43, respectively. In this case, the pre-fetch memory 44 stores a portion of the decoded pictures of the Pn+6 top field and the Pn+3 bottom field.

Figure 13:
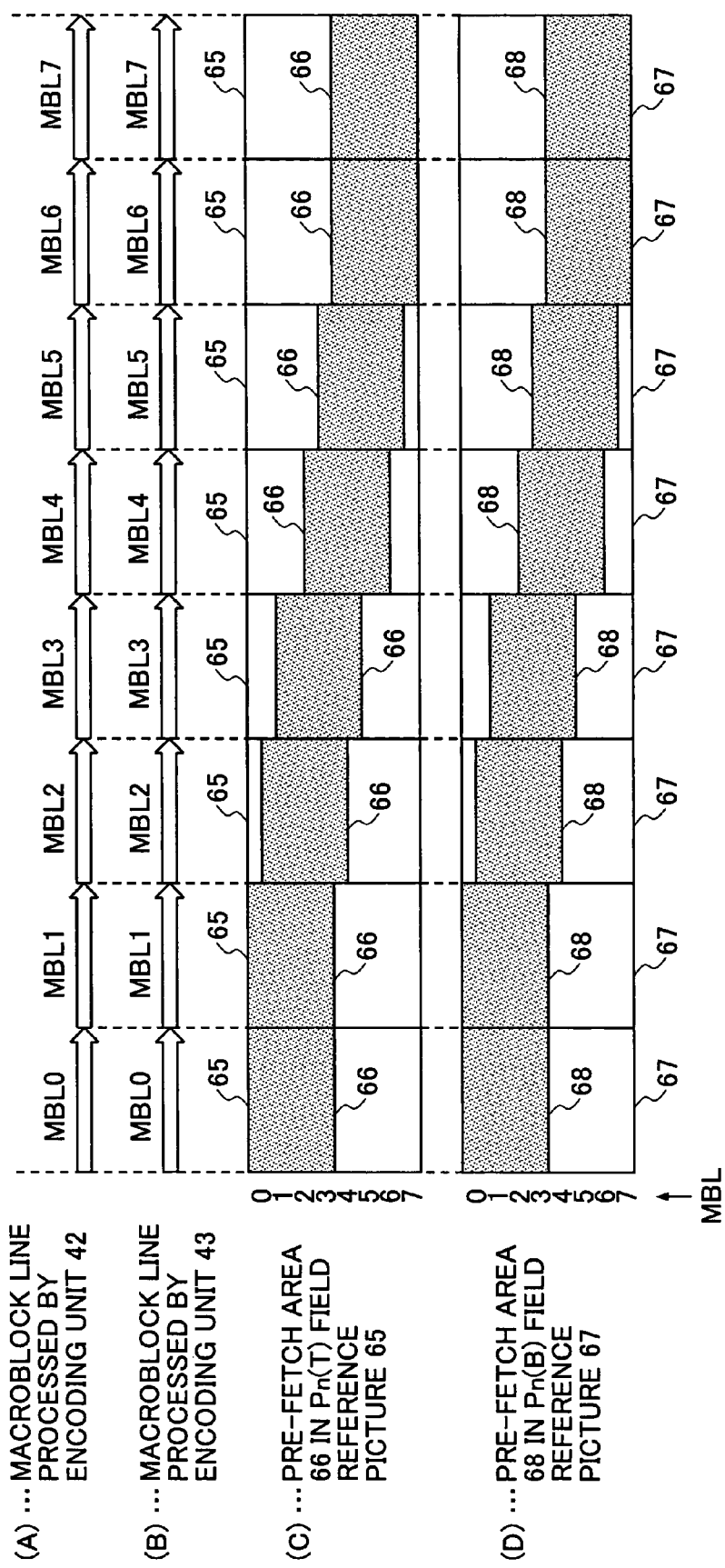
FIG. 13 is a drawing showing the transitions of a pre-fetch area pre-fetched by the pre-fetch memory and the transitions of areas processed by the two encoding units when the Bn+1 top/bottom fields shown in FIG. 9 are encoded by use of the second allocation method shown in FIG. 12.

FIG. 13 is a drawing showing the transitions of a pre-fetch area pre-fetched by the pre-fetch memory 44 and the transitions of areas processed by the encoding units 42 and 43 when the Bn+1 top/bottom fields shown in FIG. 9 are encoded by use of the second allocation method shown in FIG. 12.

In FIG. 13, a letter designation (A) illustrates the transitions of a macroblock line processed by the encoding unit 42, a letter designation (B) illustrating the transitions of a macroblock line processed by the encoding unit 43, a letter designation (C) illustrating the transitions of a pre-fetch area pre-fetched by the pre-fetch memory 44 from the reference picture of a Pn top field, and a letter designation (D) illustrating the transitions of a pre-fetch area pre-fetched by the pre-fetch memory 44 from the reference picture of a Pn bottom field.

FIG. 13 also shows a Pn top field reference picture 65, a pre-fetch area 66 in the Pn top field reference picture 65 pre-fetched by the pre-fetch memory 44, a Pn bottom field reference picture 67, and a pre-fetch area 68 in the Pn bottom field reference picture 67 pre-fetched by the pre-fetch memory 44.

In FIG. 13, illustration is omitted with respect to the transitions of a pre-fetch area of the Pn+3 top field reference picture pre-fetched by the pre-fetch memory 44 and the transitions of a pre-fetch area of the Pn+3 bottom field reference picture. These transitions are the same as those shown in FIGS. 13-(C) and (D).

In the first allocation method for the areas processed by the encoding units 42 and 43 as shown in FIG. 10, the encoding processes are not performed in a parallel fashion with respect to the encoding of the Bn+1 top field picture and the Bn+1 bottom field picture. Pre-fetching is thus necessary separately for each of the encoding of the Bn+1 top field picture and the encoding of the Bn+1 bottom field picture, resulting in two pre-fetch operations. The same also applies in the case of encoding the Bn+2 top field picture and the Bn+2 bottom field picture.

In the second allocation method for the areas processed by the encoding units 42 and 43 as shown in FIG. 12, the encoding of the Bn+1 top field picture and the encoding of the Bn+1 bottom field picture are performed in a parallel fashion, thus requiring only one pre-fetch operation. Consequently, the amount of data pre-fetched from the external memory 41 to the pre-fetch memory 44 becomes half as large. The same also applies in the case of encoding the Bn+2 top field picture and the Bn+2 bottom field picture.

As described above, the MPEG encoder 40 that is an embodiment of a moving-picture processing apparatus of the first principle is configured such that the encoding units 42 and 43 share the pre-fetch memory 44, and such that the encoding units 42 and 43 may perform the parallel processing of adjacent macroblock lines situated one over the other in the processed image, for example.

In such a case, even when the vertical size of each of the search areas searched by the encoding units 42 and 43 is set in the same manner as in the case of the pre-fetch memories 5 and 6 provided for the encoding units 3 and 4 in the MPEG encoder 1 shown in FIG. 1, the vertical size of the total search area can be made smaller than the total vertical size of the search areas required in the configuration in which the two pre-fetch memories 5 and 6 are provided as in the MPEG encoder 1.

Accordingly, the vertical size of the pre-fetch area pre-fetched to the pre-fetch memory 44 can be made smaller than the total vertical size of the pre-fetch areas required in the configuration in which the two pre-fetch memories 5 and 6 are provided as in the case of the MPEG encoder 1. Further, the memory volume required for the pre-fetch memory 44 can be made smaller than the memory volume required in the configuration in which the two pre-fetch memories 5 and 6 are provided as in the case of the MPEG encoder 1, thereby reducing the amount of data transfer between the external memory 41 and the pre-fetch memory 44.

In the case in which MBAFF (macroblock-adaptive frame/field coding) according to H.264/AVC is used for encoding, the encoding unit 42 may take care of even-number macroblock pair lines in a picture, and the encoding unit 43 may take care of odd-number macroblock pair lines in the picture, such that the encoding units 42 and 43 perform the parallel processing of adjacent macroblock pair lines situated one over the other.

In the MPEG encoder 40 that is an embodiment of a moving-picture processing apparatus of the first principle, the encoding units 42 and 43 may be made to perform the parallel processing of predetermined multiple images corresponding to a common reference picture. As shown in FIG. 12, for example, the encoding units 42 and 43 may perform the parallel processing of a top field picture and a bottom field picture when the Bn+1 top/bottom field pictures and Bn+2 top/bottom field pictures are to be encoded. This also makes it possible to reduce the amount of data transfer between the external memory and the pre-fetch memory.

The embodiment of a moving-picture processing apparatus according to the first principle has been described with reference to a case in which the moving-picture processing apparatus of the first principle is applied to an MPEG encoder. It should be noted that the moving-picture processing apparatus of the first principle is also applicable to an MPEG decoder as shown in FIG. 16, in which two decoding units 142 and 143 are provided in place of the encoding units 42 and 43.

Figure 16:
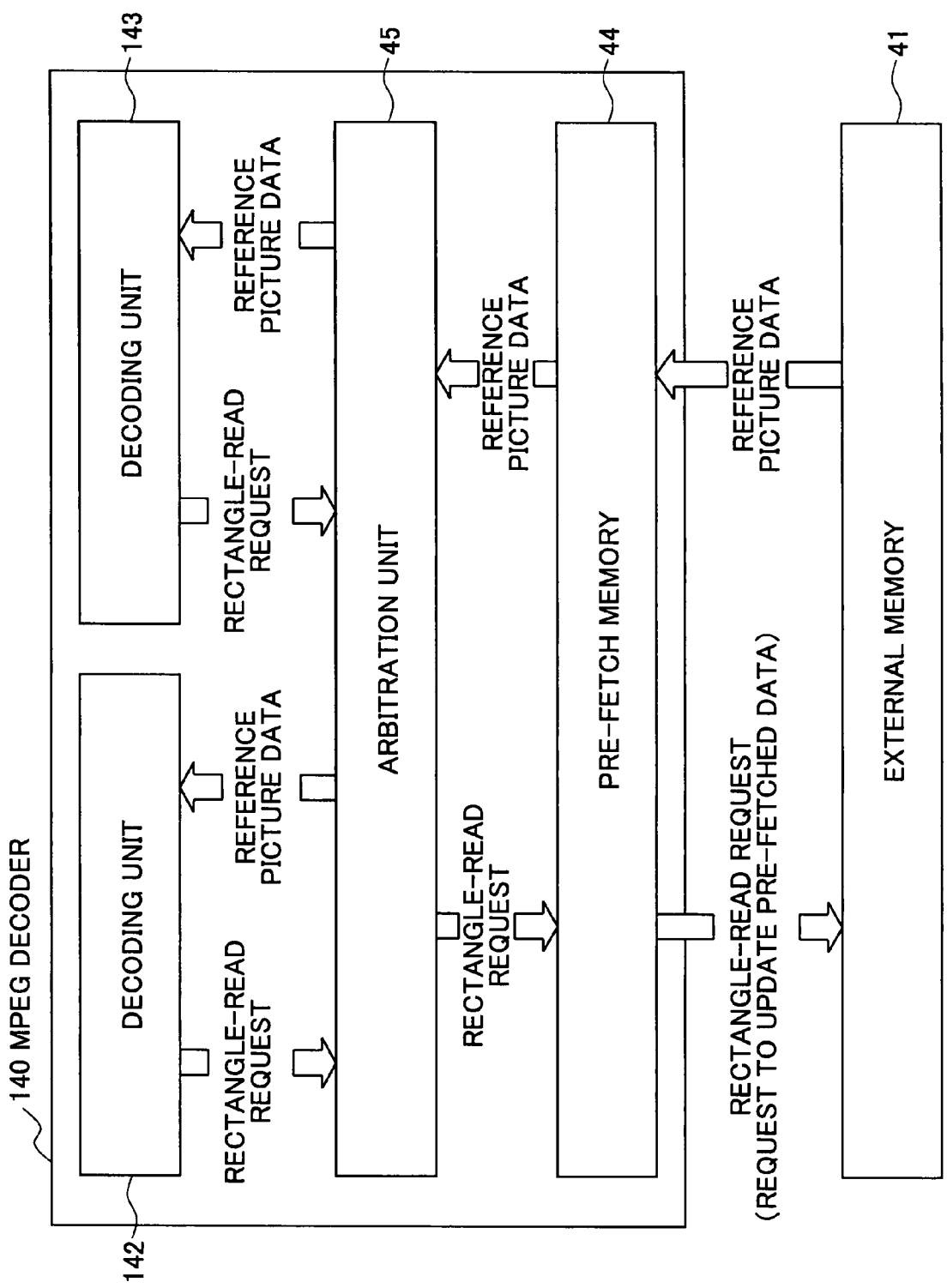
FIG. 16 is a drawing showing an MPEG decoder according to an embodiment of the present invention.

In FIG. 16, the same elements as those of FIG. 6 are referred to by the same numerals, and a description thereof will be omitted. The decoding units 142 and 143 perform computation necessary to decode an MPEG stream. The decoding units 142 and 143 perform the parallel processing of adjacent macroblock lines situated one over the other or the parallel processing of multiple images belonging to a common reference picture, or selectively perform the parallel processing of adjacent macroblock lines situated one over the other and the parallel processing of multiple images belonging to a common reference picture.

Figure 14:
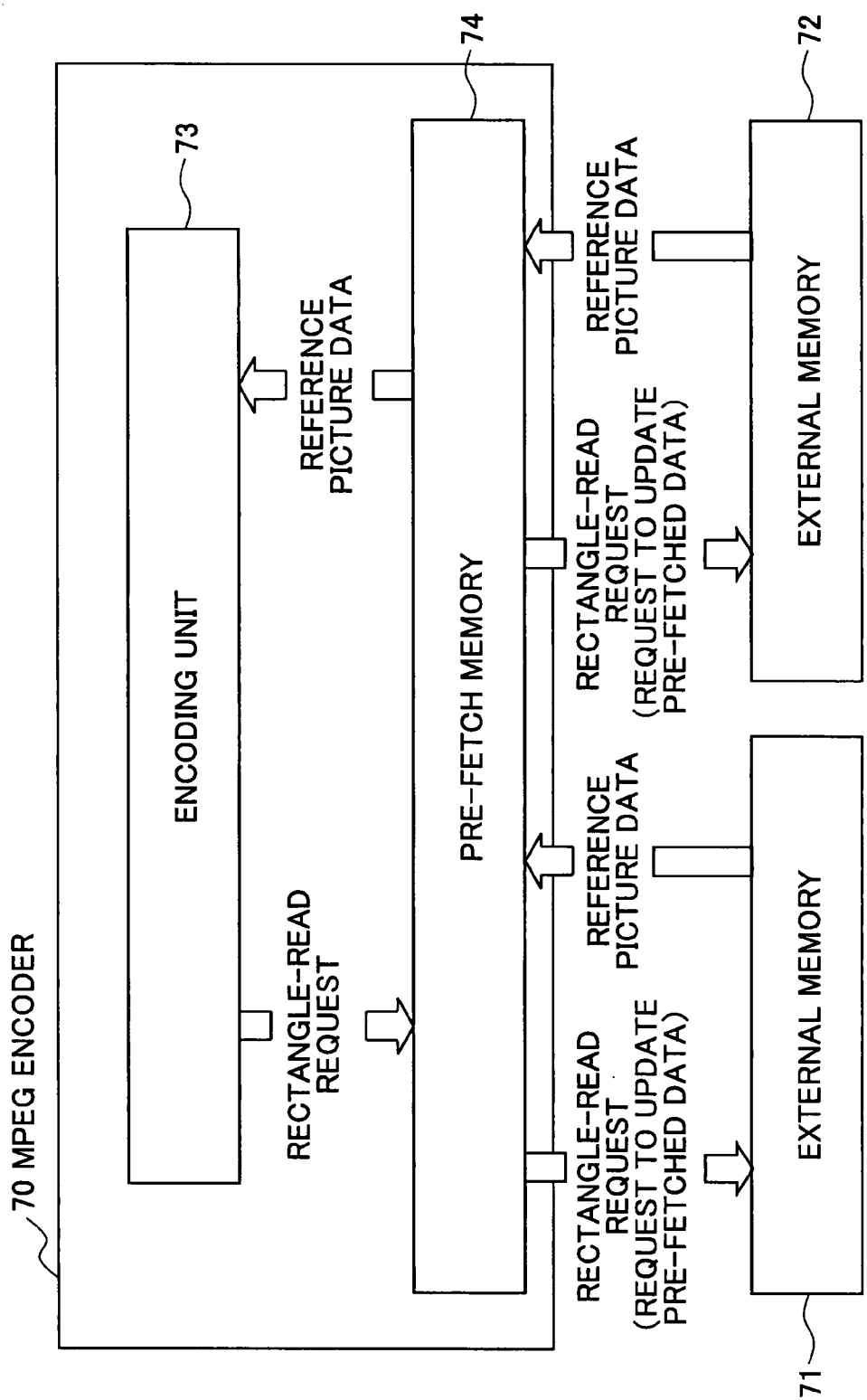
FIG. 14 is a drawing showing an MPEG encoder that is an embodiment of a moving-picture processing apparatus according a second principle together with an external memory.

FIG. 14 is a drawing showing an MPEG encoder that is a second embodiment of a moving-picture processing apparatus with an external memory. What is shown in FIG. 14 are an MPEG encoder 70 that is an embodiment of a moving-picture processing apparatus according to a second principle and external memories 71 and 72 for storing a reference picture that is referred to by the MPEG encoder 70 to compute a motion vector. The external memory 71 stores even-number lines of the reference picture, and the external memory 72 stores odd-number lines of the reference picture.

In the MPEG encoder 70, an encoding unit 73 performs processing that is necessary to generate an MPEG stream, and a pre-fetch memory 74 is used to pre-fetch and store a portion of a reference picture stored in the external memories 71 and 72.

Further, the encoding unit 73 issues a rectangle-read request to the pre-fetch memory 74 when the encoding unit 73 uses a rectangular portion of the image stored in the pre-fetch memory 74 for the purpose of computing a motion vector. This rectangle-read request includes information indicative of the position and size of the rectangular portion that is to be retrieved.

Figure 15:
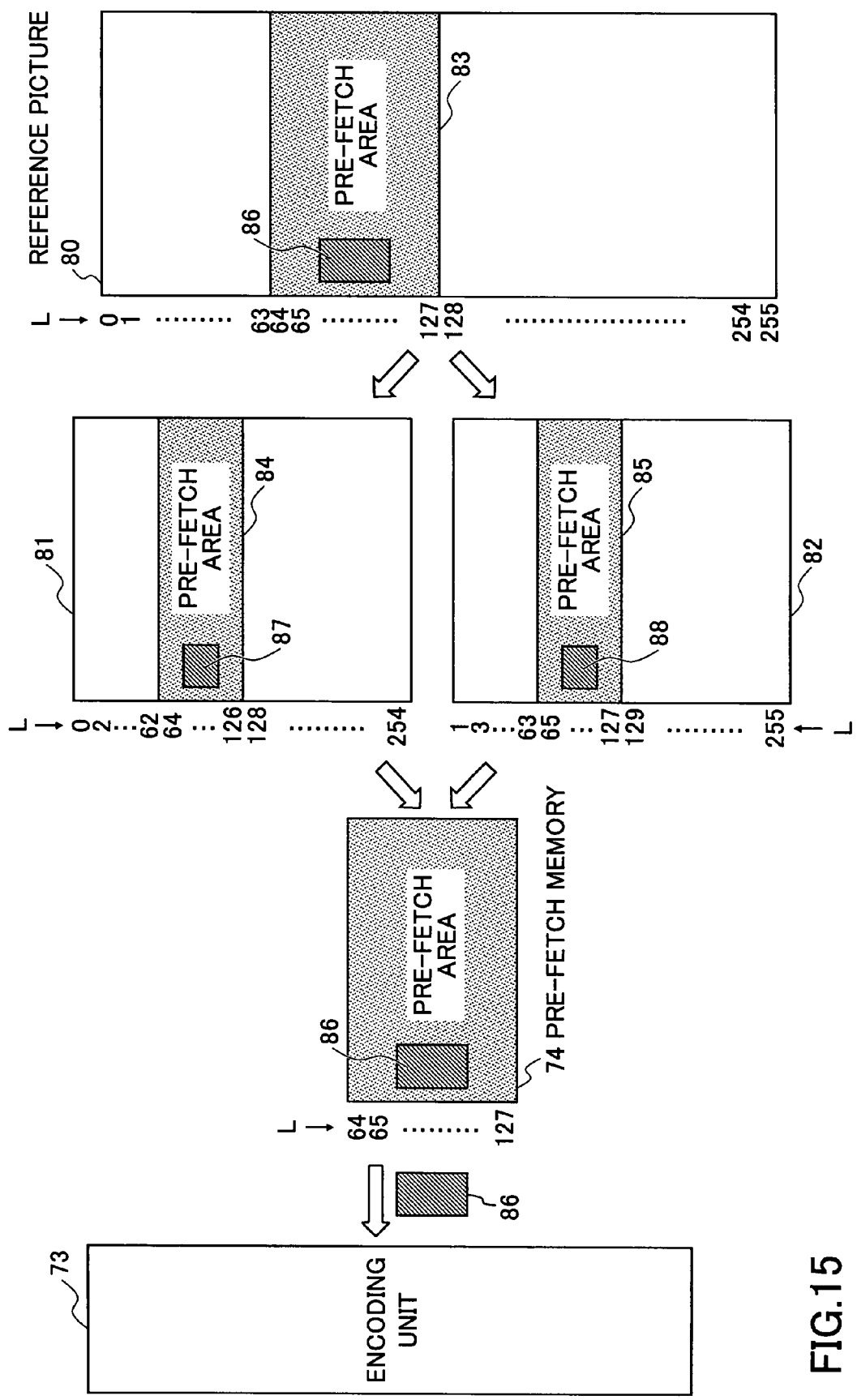
FIG. 15 is a drawing for explaining the detail of a read operation with respect to the pre-fetch memory provided in the MPEG encoder that is the embodiment of a moving-picture processing apparatus according the second principle.

FIG. 15 is a drawing for explaining the detail of read operation performed with respect to the pre-fetch memory 74. What is shown in FIG. 15 includes a reference picture 80, an even-number-line reference picture 81 comprised of even-number lines L0, L2, . . . , L254 of the reference picture 80, an odd-number-line reference picture 82 comprised of odd-number lines L1, L3, . . . , L255 of the reference picture 80. The even-number-line reference picture 81 is stored in the external memory 71, and the odd-number-line reference picture 82 is stored in the external memory 72.

In this example, lines L64 through L127 of the reference picture 80 constitute a pre-fetch area 83. The even-number lines L64, L66, . . . , and L126 of the pre-fetch area 83 are pre-fetched to the pre-fetch memory 74 as a pre-fetch area 84, and the odd-number lines L65, L67, . . . , and L127 of the pre-fetch area 83 are pre-fetched to the pre-fetch memory 74 as a pre-fetch area 85.

Consequently, the pre-fetch memory 74 stores the lines L64 though L127 of the reference picture 80. When the encoding unit 73 needs a rectangular area 86 of the reference picture 80, the encoding unit 73 issues a rectangle-read request to the pre-fetch memory 74 to request the rectangular area 86, so that the image data of the rectangular area 86 is read from the pre-fetch memory 74 and transferred to the encoding unit 73. In FIG. 15, a portion 87 corresponds to the even-line numbers of the rectangular area 86, and a portion 88 corresponds to the odd-line numbers of the rectangular area 86.

In the MPEG encoder 20 shown in FIG. 4, the two pre-fetch memories 24 and 25 are provided for a single encoding unit 23, such that the pre-fetch memory 24 stores an even-number-line portion of the pre-fetch area of the reference picture 30, and the pre-fetch memory 25 stores an odd-number-line portion of the pre-fetch area of the reference picture 30. With this configuration, the encoding unit 23 needs to issue a rectangle-read request separately for each of the pre-fetch memories 24 and 25, which gives rise to a problem in that the reading operation is inefficient.

In the MPEG encoder 70 that is the embodiment of a moving-picture processing apparatus according to the second principle, on the other hand, only one pre-fetch memory 44 is provided as a pre-fetch memory for pre-fetching and storing a portion of the reference picture. Even when two external memories 71 and 72 are used to store the reference picture, thus, the encoding unit 73 does not have to issue two rectangle-read requests as in the case in which the two pre-fetch memories 24 and 25 are provided in the MPEG encoder 20 shown in FIG. 4, and it suffices for the encoding unit 73 to issue a single rectangle-read request to the single pre-fetch memory 44. Accordingly, the reading of image data from the pre-fetch memory 44 can efficiently be performed.

The embodiment of a moving-picture processing apparatus according to the second principle has been described with reference to a case in which the moving-picture processing apparatus of the second principle is applied to an MPEG encoder. It should be noted that the moving-picture processing apparatus of the second principle is also applicable to an MPEG decoder, in which a decoding unit is provided in place of the encoding unit 73 shown in FIG. 14.

Further, the present invention is not limited to these embodiments, but various variations and modifications may be made without departing from the scope of the present invention.

What is claimed is:

1. A moving-picture processing apparatus, comprising:
a plurality of decoding or encoding units including a first processing unit and a second processing unit;
a pre-fetch memory to store a specified part of a reference picture used for inter-frame prediction; and
an arbitration unit,
wherein first image data included in the specified part of the reference picture stored in the pre-fetch memory is read by the first processing unit to perform first processing for the inter-frame prediction, and second image data included in the specified part of the reference picture stored in the pre-fetch memory is read by the second processing unit to perform second processing for the inter-frame prediction,
wherein the first image data read for the first processing from the pre-fetch memory overlaps at least part of the second image data read for the second processing from the pre-fetch memory, the first processing being performed concurrently with the second processing, and
wherein the pre-fetch memory is shared by the first processing unit and the second processing unit to store the specified part of the reference picture, the specified part of the reference picture being transferred from an external memory to the pre-fetch memory and accessed by both the first processing unit and the second processing unit, and the arbitration unit is configured to arbitrate between simultaneous access requests, the simultaneous access requests including an access request issued to the pre-fetch memory from the first processing unit and an access request issued to the pre-fetch memory from the second processing unit.

2. The moving-picture processing apparatus as claimed in claim 1, wherein the plurality of decoding or encoding units perform parallel processing of adjacent macroblock lines or macroblock pair lines situated one over another in a processed picture.

3. The moving-picture processing apparatus as claimed in claim 1, wherein the plurality of decoding or encoding units perform parallel processing of multiple processed pictures belonging to a common reference picture.

4. The moving-picture processing apparatus as claimed in claim 3, wherein the plurality of decoding or encoding units includes two decoding or encoding units, and the multiple processed pictures are a top field picture and a bottom field picture belonging to a common frame.

5. The moving-picture processing apparatus as claimed in claim 1, wherein the plurality of decoding or encoding units selectively perform parallel processing of adjacent macroblock lines or macroblock pair lines situated one over another in a processed picture or parallel processing of multiple processed pictures belonging to a common reference picture.

* * * * *